J. H. HARVEY.
NUT LOCK.
APPLICATION FILED MAR. 21, 1910.
971,675.
Patented Oct. 4, 1910.
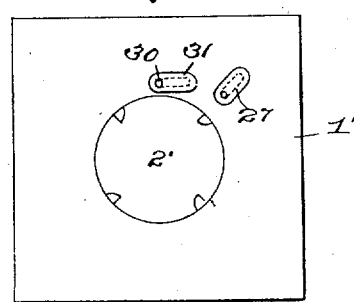
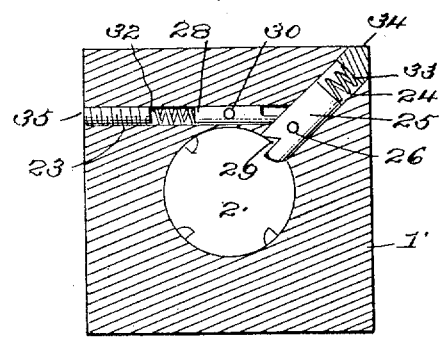
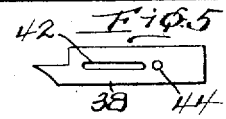
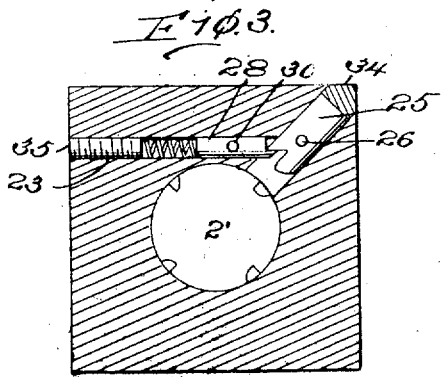
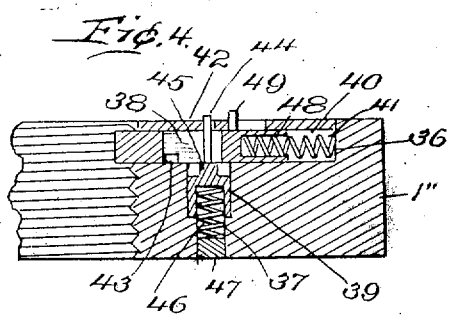
Witnesses
Inventors
Josiah H. Harvey

UNITED STATES PATENT OFFICE.

JOSIAH H. HARVEY, OF SCRANTON, PENNSYLVANIA.

NUT-LOCK.

971,675.  Specification of Letters Patent.  Patented Oct. 4, 1910.

Application filed March 21, 1910. Serial No. 550,607.

*To all whom it may concern:*

Be it known that I, JOSIAH H. HARVEY, a citizen of the United States, residing at Scranton, in the county of Lackawanna and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to improvements in nut-locks, and more particularly to means by which the nut is locked upon a bolt.

The object in view is the arrangement in a nut lock, of means for locking a nut or bolt against accidental removal.

Another object of the invention is the arrangement in a nut lock, of means for permitting the free rotation of the nut when securing the nut in place but preventing a reverse rotation of the nut.

A further object of the invention is the arrangement in a nut lock, of a reciprocating dog or pawl adapted to engage a groove in a bolt, and an auxiliary dog or pawl for locking the first mentioned dog or pawl out of engagement with the bolt.

A still further object of the invention is the arrangement in a pawl, of means adapted to be manipulated for locking a nut against rotation in either direction.

With these and other objects in view the invention comprises certain novel constructions, combinations, and arrangement of parts as will be hereinafter more fully described and claimed.

In the accompanying drawings: Figure 1 is a plan view of an embodiment of the invention. Fig. 2 is a longitudinally vertical section through the structure shown in Fig. 1. Fig. 3 is a view similar to Fig. 1, but with the locking dog shown retracted. Fig. 4 is a detail sectional view through a slightly modified form of the device shown in Fig. 3. Fig. 5 is a top plan view of the dog shown in Fig. 4.

In constructing a nut lock embodying the invention, various detail structures may be utilized, all of which embody the same principle, namely the provision of a locking dog for preventing the reverse rotation of a nut, or the rotation of the nut in either direction. These locking dogs are slidably arranged in the nut and adapted to engage grooves arranged in the bolt, to which the nut is secured, and are also adapted to be manually operated for disengaging the dogs from the bolt. Associated with these respective dogs, are pawls or auxiliary locking means adapted to either lock the dogs against the bolt or out of engagement with the bolt.

In order that the invention may be more clearly understood, an embodiment of the invention is shown in the accompanying drawings, in which nut 1' is provided with a pair of apertures 23 and 24 arranged therein, which apertures may be cylindrical or any other desired shape. Arranged in aperture 24 is a dog 25 adapted to operate in a similar manner to dog 5, but provided with a pin 26 passing through slot 27 in order to convey motion manually to dog 25 for reciprocating the same. Arranged in aperture 23 is a locking dog or pawl 28 designed to engage offset portion or notch 29 in dog 25 when dog 25 has been retracted, as shown in Fig. 3. Pawl 28 is provided with a pin 30 which extends through slot 31 for permitting movement to be conveyed to pawl 28 for releasing the same. Pin 30 is rigidly secured to a plate 30' and is adapted to be reciprocated or moved laterally through slot 31 or rather along slot 31 at the same time that cover 30' is moved. Cover 30' acts as a hand hold or grip member for easily manipulating pin 30, and also acts as a cover for slot 31. Slot 27 is provided with a cover 27' which is rigidly secured to pin 26 and is designed to operate in a similar manner to cover 30'. A spring 32 engages pawl 28 for normally giving the same a tendency to move into notch 29, and dog 25 is provided with a spring 33 for giving the dog a continuous tendency to engage the bolt 2' which is provided with suitable slots or notches for receiving the same. A plug 34, preferably threaded, is fitted into the end of aperture 24 for holding spring 33 in position, and a plug 35 is mounted in aperture 23 for holding spring 32 in position.

In Fig. 4 will be seen a slightly modified form of the invention, in which a nut 1'' is provided with apertures 36 and 37 for receiving a dog 38 and a locking member 39 therefor. Dog 38 is adapted to operate or engage a bolt similar to the preferred structure, but is retracted from such engagement and locked in such a retracted position in a slightly different manner. Dog 38 is provided with a hollowed out portion 40, which accommodates spring 41, the spring 41 and hollowed out portion, acting similar to spring 12 and hollowed out portion 11 of the preferred structure, and will therefore need no further description. Dog 38 is also provided with a slot 42 and a notched out portion 43 for accommodating pin 44 and stud or projection 45 respectively. The locking member 39 is continuously pressed by a spring 46 which is held in place by a plug 47 and which is positioned for the greater part of its length in a recess provided in member 39. The locking member 39 is provided with a stud or reduced portion 45 for fitting into socket 43, and also a pin 44 which extends through the slot 42 in dog 38, and also through an aperture in plate 48. In order that the lug 45 may be permitted to engage socket 43 a pin 49 is provided which passes through a slot 50, and is secured to dog 38 whereby the dog may be moved against the action of spring 41 until socket 43 is above lug 45, whereupon lug 45 will move upward into the socket under the influence of spring 46. This will positively lock dog 38 in a retracted position. Whenever it is desired to release dog 38 pin 44 is depressed and the dog will move outward immediately upon the influence of spring 41.

What I claim is:

1. In a nut lock, the combination with a nut, of a movable dog arranged therein formed with a spring receiving cavity, a spring positioned in said cavity for normally holding said dog in an outer position, and spring pressed means for locking said dog in an inner position.

2. In a nut lock, the combination with a nut, of a reciprocating dog formed with a longitudinal bore, a spring positioned partly in said bore for holding said dog in an outer position, and spring pressed means for locking said dog in an inner position.

3. In a nut lock, the combination with a nut having a plurality of ways formed therein intersecting each other, of a reciprocating dog in one of said ways, means for yieldingly holding in an outer position said dog, a reciprocating locking member arranged in the other of said ways, and cushioning means for causing said locking member to engage said dog when moved to an inner position for locking the same against operation.

4. In a nut lock, the combination with a nut, of a reciprocating dog, means for locking said dog, a manually operated pin secured to said dog for withdrawing the dog, and a manually operated pin secured to said first mentioned means for withdrawing the same and unlocking the dog.

5. In a nut lock, the combination with a nut, of a reciprocating dog, means for normally holding said dog in an outer position, means for causing an inward movement of said dog, a catch for engaging said dog when in an inner position, a spring for normally holding in an inner position said catch, and a manually operated pin for releasing said catch.

6. In a nut lock, the combination with a nut and a notched bolt having notches therein, of a reciprocating dog arranged in said nut and adapted to engage said notches, a spring for normally holding in an outer position said dog, a cushioned catch for holding said dog in an inner position when moved to such position, and a lateral movable pin for disengaging said catch.

In testimony whereof I affix my signature in presence of two witnesses.

JOSIAH H. HARVEY.

Witnesses:
JOHN L. FLETCHER,
A. L. KITCHIN.